United States Patent [19]

Plueddemann

[11] 4,231,910

[45] Nov. 4, 1980

[54] PRIMER COMPOSITION

[75] Inventor: Edwin P. Plueddemann, Midland, Mich.

[73] Assignee: Dow Corning Corporation, Midland, Mich.

[21] Appl. No.: 10,295

[22] Filed: Feb. 8, 1979

[51] Int. Cl.³ .......................... C08L 61/28; C09J 3/16
[52] U.S. Cl. ................................ 260/29.4 R; 156/329; 260/33.4 R; 525/509; 528/27
[58] Field of Search .......................... 528/27; 525/509; 260/29.4 R, 33.4 R; 156/329

[56] References Cited

U.S. PATENT DOCUMENTS

| | | | |
|---|---|---|---|
| 3,177,170 | 4/1965 | Lund | 260/29.4 R |
| 3,306,800 | 2/1967 | Plueddemann | 156/329 |
| 3,488,310 | 1/1970 | McCombs | 260/29.3 |
| 3,664,982 | 5/1972 | Preston et al. | 260/29.4 R |
| 4,001,154 | 1/1977 | Schmidt | 260/29.4 R |

*Primary Examiner*—Wilbert J. Briggs, Sr.
*Attorney, Agent, or Firm*—James E. Bittell

[57] ABSTRACT

A primer composition consisting essentially of 75 to 99 percent alkoxymethyltriazine and 1 to 25 percent 3-glycidoxypropyltrimethoxysilane, 2-(3,4-epoxycyclohexyl)-ethyltrimethoxysilane, 3-mercaptopropyltrimethoxysilane, 2-mercaptoethyltrimethoxysilane or a partial hydrolyzate of the silanes is employed to improve wet and dry adhesion of thermoplastics to solid substrates.

5 Claims, No Drawings

PRIMER COMPOSITION

BACKGROUND OF THE INVENTION

1. Field of the Invention

This invention relates to a primer composition for improving the adhesion between a solid substrate and a thermoplastic. More particularly this invention relates to a primer composition consisting essentially of an epoxy or mercapto functional organosilicon compound and an alkoxymethyltriazine compound.

2. Description of the Prior Art

Organic plastics are divided into two categories: thermoplastic resins and thermosetting resins. The former are unreactive materials which soften on heating and harden on cooling without any appreciable formation of new chemical bonds. Thermosetting resins are reactive materials which harden on heating due to the formation of new chemical bonds which crosslink the material.

Organofunctional silanes which react with the thermosetting resins through the organofunctional group have been successfully used as primers to enhance the bond between many substrates and thermosetting resins. Thermoplastic materials generally do not react with the organofunctional group of a silane to form a chemical bond so that attempts to bond thermoplastics with silane primers are often disappointing. The adhesion of thermoplastics to substrates is further complicated by the tendency of water from the surroundings to rapidly deteriorate the bond strength.

One method of bonding thermoplastics is disclosed in U.S. Pat. No. 3,306,800 where a primer is employed which is an organic polymer having a molecular weight of at least 2,000 which is compatible with the thermoplastic and which has a silane grafted to each polymer molecule. Similarly, a glass coating material is described in U.S. Pat. No. 3,664,982 for improving the adhesion between glass fibers and thermoplastics. The coating material is a reaction product of a siloxane and a polyimine and may contain additionally a film forming material which is reactive with the polyimine such as hexamethoxymethylmelamine. The improved bonding is taught to result from the mechanical interlocking of the thermoplastic with the polyimine molecules, or molecules reacted therewith. It is shown that the combination of the film forming material and aminopropyltrimethoxysilane does not produce a comparable effect. The effect of water on these mechanical bonds is not discussed.

The present invention provides water resistant bonding of thermoplastics to solid substrates by use of a stable primer composition consisting essentially of an alkoxymethyltriazine and an epoxy or mercapto organofunctional silane. Although silanes such as 3-glycidoxypropyltrimethoxysilane have been used alone as primers or in combination with thermosetting resins as binders and impregnants, the concept of the above-described primer is believed to be novel. For example, U.S. Pat. No. 3,488,310 teaches that combining 3-glycidoxypropyltrimethoxysilane with a thermosetting urea-melamine-formaldehyde-glycol resin gives an improved impregnating composition for bonded glass fiber boards. The cured products have improved dry and wet tensile strength and a durable water repellent surface. Such thermosetting resin binders and impregnants do not suggest that the non-cured compositions of the instant invention would function as primers for improving adhesion between solid substrates and thermoplastics.

SUMMARY OF THE INVENTION

The present invention relates to a primer composition for application to a solid substrate to provide improved adhesion with thermoplastics, the composition consisting essentially of (A) 1 to 25 weight percent of an organosilicon compound selected from a group consisting of (1) 3-glycidoxypropyltrimethoxysilane, (2) 3-mercaptopropyltrimethoxysilane, (3) 2-mercaptoethyltrimethoxysilane, (4) 2-(3,4-epoxycyclohexyl)-ethyltrimethoxysilane, and (5) partial hydrolyzates of (1), (2), (3) or (4) and (B) 75 to 99 weight percent of an alkoxymethyltriazine which is a product of etherification of a methyloltriazine with a monohydric alcohol having 4 carbons or less.

DETAILED DESCRIPTION OF THE INVENTION

In accordance with the present invention the primer composition contains an organosilicon compound. The organosilicon compound can be 3-glycidoxypropyltrimethoxysilane, 2-(3,4-epoxycyclohexyl)-ethyltrimethoxysilane, 2-mercaptoethyltrimethoxysilane or 3-mercaptopropyltrimethoxysilane which are well known and commercially available compounds. In addition partial hydrolyzates of these silanes can be utilized in the primer compositions. "Partial hydrolyzate" is meant to imply that the silane has been hydrolyzed with water, but that a detectable amount of hydroxyl or methoxy groups remain uncondensed in the composition. It is preferable that one such group per every four silicon atoms remain uncondensed.

When the primer composition is to be stored some time before use, it is preferred to employ 3-glycidoxypropyltrimethoxysilane in the primer composition for improved stability.

Primer compositions of the present invention contain 1 to 25 weight percent of the organosilicon compound. Although some improvement in dry adhesion may be obtained with primer compositions containing less than 1 percent organosilicon compound, it has been found that 1 percent organosilicon compound is required to obtain adhesion that has improved resistance to water. Greater than 25 percent organosilicon compound may be employed but this is not preferred for reasons of economy.

The second component of the primer composition is an alkoxymethyltriazine. Alkoxymethyltriazines that are preferred in the primer compositions are products of etherification of methyloltriazines with a monohydric alcohol having 4 carbons or less and may include completely etherified products such as hexamethoxymethylmelamine and tetramethoxymethylbenzoguanamine or partially etherified products such as pentamethoxymethylmethylolmelamine, diethoxymethyldimethylolbenzoguanamine and tetrabutoxymethyldimethylolmelamine. A mixture of completely and partially etherified products may be employed. The alkoxymethyltriazines are commercially available products which are well known as acid catalyzed crosslinking agents for thermosetting epoxy and alkyd resins. The highly etherified alkoxymethyltriazines with greater than about 90 percent of the methylol groups etherified are more stable and are preferred for producing more stable primer compositions.

The primer compositions of the present invention contain 75 to 99 percent by weight alkoxymethyltriazine. When commercially available alkoxymethyltriazines which are supplied in solvents such as isopropanol, butanol and xylene are employed, sufficient solution is employed so that the weight of alkoxymethyltriazine is 75 to 99 percent of the combined weight of organosilicon compound and alkoxymethyltriazine excluding solvent weight.

The primer compositions can be prepared by cold blending the organosilicon compound and the alkoxymethyltriazine which are compatible. The compounds may also be blended in a solvent although a solvent is not normally required. Often for ease of application to solid substrates, it is preferred to dilute the primer composition to about 10 percent solids with a solvent such as methanol, ethanol, isopropanol, butanol, xylene or an aqueous alcohol mixture prior to application. When the primer composition is diluted with an aqueous solvent, it should be consumed within a few days, since the aqueous solution is not stable beyond about a week.

The primer compositions are utilized to increase both wet and dry adhesion of thermoplastics to solid substrates. The solid substrate can be any solid including siliceous material such as glass, quartz, ceramic, asbestos, silicone resin and glass fibers, metals such as aluminum, steel, copper, nickel, magnesium, and titanium, metal oxides such as MgO, $Fe_2O_3$, and $Al_2O_3$, or an organic solid such as wood, rubber or plastic materials.

The thermoplastics which may be bonded to solid substrates with the primer composition include carbonyl containing thermoplastics such as polyesters, polyamides, polyacrylates, polycarbonates, and polyurethanes and sulfone containing thermoplastics such as polysulfone, polyethersulfone and polyphenylsulfone. For example excellent bonds to glass have been obtained with polybutylene terephthalate, polyethylene terephthalate, a thermoplastic polyester elastomer which is a block copolymer of polybutylene terephthalate and butylene glycol, nylon 6/10, polycarbonate from bisphenol A and phosgene, a thermoplastic urethane elastomer and polysulfone.

Although a number of examples of thermoplastics bonded to glass are shown, it should be understood that the primer compositions of this invention can also be employed to improve the adhesion between thermoplastics such as polyester tire cord and organic solids such as cured rubber.

The primer compositions of this invention are generally specific for the types of thermoplastics described above and do not work well with thermoplastics such as polystyrene, polyolefins and polyacetals.

The primer compositions of the invention can be placed at the interface between solid substrate and thermoplastic to effect the adhesion in any convenient way. One way is to coat the surface of the solid substrate with the composition. Another way is to coat the surface of the thermoplastic or to add the composition to the thermoplastic so that at least a portion of the composition migrates to the surface of the thermoplastic and will be present at the interface between the solid substrate and the thermoplastic.

The amount of the primer composition that is coated on the surface of the solid substrate is not critical. An extremely thin layer of the material can effectively improve the adhesion.

The best adhesion is obtained when the thermoplastic or the surface of the thermoplastic is in the plastic condition when applied to the primed solid substrate. This may be accomplished by simply heating the thermoplastic to the softening point before pressing it to the solid substrate.

The following examples are presented to illustrate the invention to those skilled in the art and should not be construed as limiting the invention, which is properly delineated in the appended claims. All proportions by parts are parts by weight unless otherwise stated.

EXAMPLE 1

Primer compositions were prepared by dissolving 3-glycidoxypropyltrimethoxysilane in a liquid grade of hexamethoxymethylmelamine available from American Cyanamid Company as Cymel ® 301. The primer compositions were diluted with 90 parts methanol to 10 parts primer composition and applied to glass microscope slides, aluminum panels, titanium panels, and stainless steel panels. A polyester thermoplastic elastomer which is a block copolymer from poly(alkylene terephthalate) and poly(ether glycol) which is available from E. I. DuPont de Nemours Company as Hytrel ® 5525 was pressed (<68 kPa) against the panels for 1 minute at 225° C. The peel strength of the bonded composite was measured on the dry panels and on wet panels which were immersed for 5 days in water. The peel strengths were all measured at an angle of 90°. The data is shown in Table 1 where the symbol "N/m" means Newtons per meter.

TABLE 1

| Primer | | Peel Strength (N/m) | | | | | | | |
| --- | --- | --- | --- | --- | --- | --- | --- | --- | --- |
| Silane | Melamine | Glass | | Aluminum | | Titanium | | Steel | |
| (Parts by Weight) | (Parts by Weight) | Dry | Wet | Dry | Wet | Dry | Wet | Dry | Wet |
| None* | None | 500 | nil | — | — | — | — | — | — |
| None* | 100 | (c) | nil | — | — | — | — | — | — |
| 5 | 95 | (c) | (c) | (c) | 1,350 | (c) | nil | (c) | 190 |
| 25 | 75 | (c) | (c) | (c) | 1,120 | (c) | 1,120 | (c) | 1,160 |
| 100* | None | 560 | nil | 770 | nil | 350 | nil | 310 | nil |

*Presented for comparitive purposes only.
(c) Cohesive failure in polymer at > 2700 N/m.

EXAMPLE 2

Primer compositions were prepared by dissolving 25 parts of 3-glycidoxypropyltrimethoxysilane in 75 parts based on resin solids of various alkoxymethyltriazine resins. Primer 1 was prepared from the liquid hexamethoxymethylmelamine described in Example 1. Primer 2 was prepared from an 80 percent solution of methoxymethylmelamine resin in 1:1 isopropanol-isobutanol which is available from Rohm and Haas Company as Uformite ® MM-83. Primer 3 was prepared from a 60 percent solution of butoxymethylmelamine resin in 1:1 xylene-butanol which is available from Rohm and Haas Company as Uformite® MM-47. Primer 4 was prepared from a 60 percent solution of a butoxymethylbenzoguanamine resin in 1:1 xylene-butanol which is available from Rohm and Haas Company as Uformitre® MX-61. Primer 5 was prepared from methoxymethylmelamine resin which is available from Monsanto Company as Resimene® 740. Each primer composition was diluted with methanol to 10 percent solids and applied to glass microscope slides. The polyester thermoplastic elastomer block copolymer employed in Example 1 was pressed against the primed slides for 1 minute at 225° C. The peel strength was tested on both dry and wet slides as in Example 1. In each case, cohesive failure in the polymer was observed at greater than 2,700 N/m.

EXAMPLE 3

A non-thermosetting acrylic latex which is available from Rohm and Haas Company as Rhoplex® AC 235 was spread on glass slides primed with the compositions employed in Example 2. After the latex dried, each sample was warmed 5 minutes at 150° C. The adhesion of wet (one day water immersion) and dry samples were measured qualitatively by pulling the latex film at a 90° angle from the glass slide. If cohesive failure occurred in the film, adhesion was rated excellent. If the film could be separated only with difficulty, adhesion was rated good. If the film could be pulled off intact without difficulty, adhesion was rated fair. If the film started to separate upon drying or soaking in water without pulling, adhesion was rated poor. The results are reported in Table 2.

TABLE 2

| Primer | Adhesion of Acrylic Film | |
|---|---|---|
|  | Dry | Wet |
| 1 | Excellent | Excellent |
| 2 | " | " |
| 3 | " | " |
| 4 | " | " |
| 5 | " | Good |
| Unprimed* | Poor | Poor |

*Presented for comparative purposes only.

EXAMPLE 4

Primer compositions were prepared by dissolving various amounts of 3-glycidoxypropyltrimethoxysilane or 3-mercaptopropyltrimethoxysilane in a liquid grade hexamethoxymethylmelamine available from American Cyanamid Company as Cymel® 303. A non-thermosetting acrylic latex containing 50 percent resin solids which is available from Rohm and Haas Company as Rhoplex® AC 35 was modified by adding 5 parts of the primer compositions to 90 parts of latex. The modified latex was filmed on glass microscope slides, air dried and baked 15 minutes at 150° C. to obtain clear films. The adhesion of dry and wet films were measured qualitatively as in Example 3. The results are reported in Table 3.

TABLE 3

| Percent Silane in Primer Composition | Adhesion | | | |
|---|---|---|---|---|
|  | 3-mercaptopropyl-trimethoxysilane | | 3-glycidoxypropyl-trimethoxysilane | |
|  | Dry | Wet | Dry | Wet |
| 0 | — | — | Good | Poor |
| 0.5 | Good | Poor | " | Poor |
| 1.0 | " | Fair | " | Fair |
| 2.0 | " | Good | " | Fair |
| 4.0 | " | " | " | Good |

TABLE 3-continued

| Percent Silane in Primer Composition | Adhesion | | | |
|---|---|---|---|---|
|  | 3-mercaptopropyl-trimethoxysilane | | 3-glycidoxypropyl-trimethoxysilane | |
|  | Dry | Wet | Dry | Wet |
| 6.0 | " | " | " | " |

EXAMPLE 5

This example illustrates several types of thermoplastics which may be adhered to solid substrates by the primer compositions of this invention. A primer composition was prepared by dissolving 5 parts of 3-glycidoxypropyltrimethoxysilane in 95 parts of the liquid hexamethoxymethylmelamine employed in Example 1. The composition was diluted as in Example 1. Glass microscope slides were primed with this solution and pressed for 1 minute at 225° C. with various thermoplastics. The adhesion of the samples was measured qualitatively as in Example 3. The results are reported in Table 4.

TABLE 4

| Thermoplastic | Adhesion |
|---|---|
| Polytetramethylene terephthalate | Excellent |
| Polyamide (Nylon 6,10) | " |
| Polycarbonate from bisphenol A and phosgene | Good |
| Polysulfone | Excellent |
| Polyurethane | " |
| Cellulose acetate | Good |
| Polypropylene* | Poor |
| Polystyrene* | " |
| Polyvinyl chloride* | " |

*Presented for comparative purposes only.

EXAMPLE 6

A primer composition was prepared by dissolving 5 parts of 3-glycidoxypropyltrimethoxysilane in 95 parts of liquid grade hexamethoxymethylmelamine available from American Cyanamid Company as Cymel® 303. The primer was diluted with 90 parts methanol to 10 parts primer composition. Dacron® and Kevlar® fabric samples were dipped into the diluted primer and dried for 30 minutes at 100° C. The fabric was fused at 175° C. with low pressure (˜68 kPa) between sheets of the thermoplastic elastomer block copolymer described in Example 1. The peel strengths of the composites were measured at an angle of 90°. The Dacron® composite had a peel strength of $5.4 \times 10^3$ N/m and the Kevlar® composite showed cohesive failure at $>7.0 \times 10^3$ N/m. For comparison similar composites prepared without the primer had peel strengths of $1.1 \times 10^3$ N/m for Dacron® and $4.6 \times 10^3$ N/m for Kevlar®.

EXAMPLE 7

This example illustrates the thermal stability of the primer compositions of this invention. A primer composition prepared by dissolving 5 parts of 3-glycidoxypropyltrimethoxysilane in 95 parts of liquid grade hexamethoxymethylmelamine described in Example 1, was heated in an aluminum dish on a hot plate at 225° C. for 30 minutes. There was no obvious change in viscosity during the heat treatment. Diluted primer was applied to glass microscope slides as described in Example 1. The polyester thermoplastic elastomer block copolymer described in Example 1 was pressed against the slides for 1 minute at 225° C. The adhesion of the copolymer to the slides was excellent, with cohesive failure occuring in the copolymer.

That which is claimed is:

1. A primer composition for application to a solid substrate to provide improved adhesion with thermoplastics, the composition consisting essentially of (A) 1 to 25 weight percent of an organosilicon compound selected from a group consisting of (1) 3-glycidoxypropyltrimethoxysilane, (2) 3-mercaptopropyltrimethoxysilane, (3) 2-mercaptoethyltrimethoxysilane, (4) 2-(3,4-epoxycyclohexyl)-ethyltrimethoxysilane and (5) partial hydrolyzates of (1), (2), (3) or (4) and (B) 75 to 99 weight percent of an alkoxymethyltriazine which is a product of etherification of a methyloltriazine with a monohydric alcohol having 4 carbons or less.

2. A primer composition in accordance with claim 1 wherein the organosilicon compound is 3-glycidoxypropyltrimethoxysilane.

3. A primer composition in accordance with claim 1 wherein the alkoxymethyltriazine is highly etherified.

4. A primer composition in accordance with claim 3 wherein the alkoxymethyltriazine is hexamethoxymethylmelamine.

5. A primer composition in accordance with claim 1 which is diluted with alcohol or aqueous alcohol solvent.

* * * * *

UNITED STATES PATENT AND TRADEMARK OFFICE
CERTIFICATE OF CORRECTION

PATENT NO. : 4,231,910

DATED : November 4, 1980

INVENTOR(S) : E. P. Plueddemann

It is certified that error appears in the above-identified patent and that said Letters Patent are hereby corrected as shown below:

In Column 6, line 45; the line reading "175°C. with low pressure (°68 kPa) between sheets of" should read "175°C. with low pressure (<68 kPa) between sheets of"

Signed and Sealed this

Twenty-fourth Day of November 1981

[SEAL]

Attest:

GERALD J. MOSSINGHOFF

Attesting Officer — Commissioner of Patents and Trademarks